US011550443B1

(12) United States Patent
Sivadas et al.

(10) Patent No.: US 11,550,443 B1
(45) Date of Patent: Jan. 10, 2023

(54) DYNAMIC WIDGET FOR DISPLAYING STATUS INFORMATION

(71) Applicant: Dell Products L.P., Round Rock, TX (US)

(72) Inventors: Vipin Sivadas, Hyderabad (IN); Rakesh Mohan, Bangalore (IN); Manchikalapati Sushma, Hyderabad (IN); Rajababu Kongara, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/474,525

(22) Filed: Sep. 14, 2021

(51) Int. Cl.
| | |
|---|---|
| *G06F 3/0481* | (2022.01) |
| *G06F 3/04847* | (2022.01) |
| *G06F 16/9538* | (2019.01) |
| *G06F 9/54* | (2006.01) |
| *G06F 9/451* | (2018.01) |
| *H04L 67/00* | (2022.01) |

(52) U.S. Cl.
CPC ........ *G06F 3/0481* (2013.01); *G06F 3/04847* (2013.01); *G06F 9/451* (2018.02); *G06F 9/541* (2013.01); *G06F 16/9538* (2019.01); *H04L 67/34* (2013.01)

(58) Field of Classification Search
CPC .... G06F 3/0481; G06F 3/04847; G06F 3/048; G06F 9/451; G06F 16/9538; H04L 67/34
See application file for complete search history.

(56) References Cited

U.S. PATENT DOCUMENTS

| 9,262,396 | B1 * | 2/2016 | Rodriguez Valadez ..................... G06F 16/957 |
| 2008/0307085 | A1 * | 12/2008 | Curran ................ H04L 61/1511 709/223 |
| 2016/0275006 | A1 * | 9/2016 | Blandford .......... G06Q 10/0639 |
| 2018/0275881 | A1 * | 9/2018 | Ashraf .................... G06F 3/065 |
| 2020/0311032 | A1 * | 10/2020 | Whitehead ............... G09B 5/10 |
| 2021/0073713 | A1 * | 3/2021 | Balasubramanian ........................ G06Q 10/06316 |

(Continued)

OTHER PUBLICATIONS

Wikipedia contributors, "Software widget", In Wikipedia, The Free Encyclopedia. Retrieved 13:53, Sep. 14, 2021, from https://en.wikipedia.org/w/index.php?title=Software_widget&oldid=1013886518. Mar. 24, 2021.

(Continued)

*Primary Examiner* — Jeanette J Parker
(74) *Attorney, Agent, or Firm* — Ryan, Mason & Lewis, LLP

(57) ABSTRACT

Methods, apparatus, and processor-readable storage media for implementing dynamic widgets for displaying status information are provided herein. An example computer-implemented method includes executing a software widget configured to display, on a user device, status information associated with a plurality of items of an online data source; obtaining the status information from an application server via a first application programming interface, wherein the application server maintains at least a portion of the status information in a local database using a second application programming interface associated with the online data source; and updating a graphical user interface of the software widget to display the status information on the user device.

20 Claims, 10 Drawing Sheets

(56) References Cited

U.S. PATENT DOCUMENTS

2021/0150489 A1* 5/2021 Haramati .......... G06Q 10/1097

OTHER PUBLICATIONS

"What is Azure DevOps?", Microsoft Corp., Available at https://docs.microsoft.com/en-us/azure/devops/user-guide/what-is-azure-devops?view=azure-devops, last accessed Sep. 14, 2021.

* cited by examiner

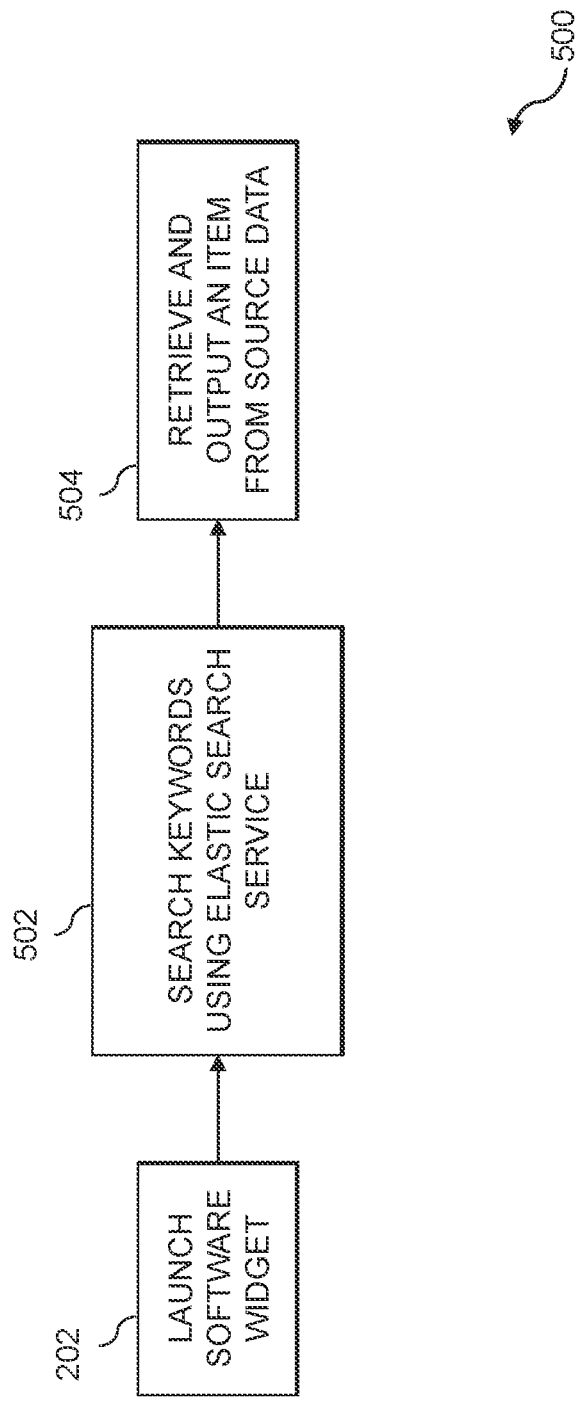

DYNAMIC WIDGET FOR DISPLAYING STATUS INFORMATION

FIELD

The field relates generally to information processing systems, and more particularly to graphical user interfaces (GUIs) in such systems.

BACKGROUND

Software widgets are relatively simple software applications or components. There are different types of software widgets including, for example, desktop widgets and mobile widgets. A desktop widget typically runs on a computer desktop and provides a user with access to certain functions of an associated application or service, for example. Generally, it is desirable to limit the amount of computer resources used by software widgets as they often remain executing on a computer of a user. This can be difficult, however, when new or more advanced widget features are needed, or when the associated application or service is complex or involves large amounts of data.

SUMMARY

Illustrative embodiments of the disclosure provide techniques for implementing dynamic widgets for displaying status information. An exemplary computer-implemented method includes executing a software widget configured to display, on a user device, status information associated with a plurality a items of an online data source; obtaining the status information from an application server via a first application programming interface, wherein the application server maintains at least a portion of the status information in a local database using a second application programming interface associated with the online data source; and updating a graphical user interface of the software widget to display the status information on the user device.

Illustrative embodiments can provide significant advantages relative to conventional software widgets. For example, challenges associated with developing lightweight widgets are overcome in one or more embodiments by providing a scalable widget architecture that enables faster and more efficient software widgets, as well as improved user interface elements.

These and other illustrative embodiments described herein include, without limitation, methods, apparatus, systems, and computer program products comprising processor-readable storage media.

BRIEF DESCRIPTION OF THE DRAWINGS

FIG. 5 shows an example of a data flow diagram for a search process in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
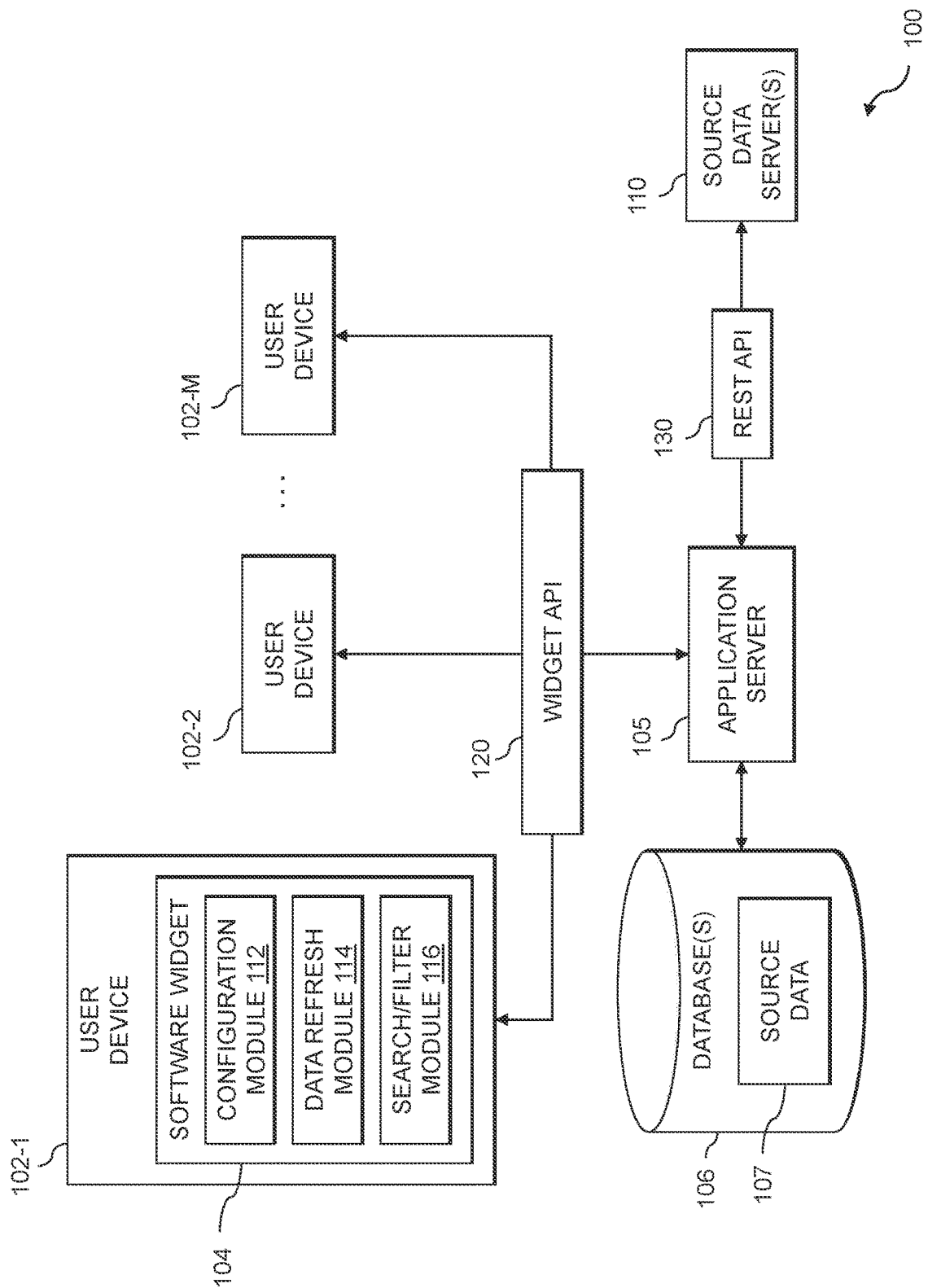
FIG. 1 shows an information processing system configured for implementing dynamic widgets for displaying status information in an illustrative embodiment.

FIG. 1 shows an information processing system 100 configured in accordance with an illustrative embodiment. The information processing system 100 comprises a plurality of user devices 102-1, 102-2, . . . 102-M, collectively referred to herein as user devices 102. The user devices 102 may be coupled to a network, where the network in such an embodiment is assumed to represent a sub-network or other related portion of the larger information processing system 100. Also coupled to the network is an application server 105 and one or more source data servers 110.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The above-noted network is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a Wi-Fi or WiMAX network, or various portions or combinations of these and other types of networks. The information processing system 100 in some embodiments therefore comprises combinations of multiple different types of networks, each comprising processing devices configured to communicate using internet protocol (IP) or other related communication protocols.

In the example shown in FIG. 1, the user device 102-1 further comprises a software widget 104, which includes a configuration module 112, a data refresh module 114, and a search and filter module 116. It is noted that the other user devices 102 may be implemented in a similar manner as user device 102-1.

The term "software widget" as used herein is intended to be broadly construed, so as to encompass, for example, mobile widgets, desktop widgets, web widgets, or other types of stand-alone software applications that are typically embedded within a user interface (such as a desktop or web page, for example) and provide relevant information from, or specific ways for interacting with, one or more applications or one or more data sources.

It is to be appreciated that this particular arrangement of modules 112, 114 and 116 illustrated in the user device 102-1 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

An exemplary process utilizing elements 112, 114 and 116 of an example user device 102 in information processing system 100 will be described in more detail with reference to the flow diagrams of FIGS. 2-5 and 8.

Additionally, the application server 105 can have at least one associated database 106 configured to store data pertaining to, for example, an application or service associated with the one or more source data servers 110.

An example database 106, such as depicted in the present embodiment, can be implemented using one or more storage systems associated with the application server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the application server 105 are one or more input-output devices, which illustratively comprise keyboards, displays or other types of input-output devices in any combination. Such input-output devices can be used, for example, to support one or more user interfaces to the application server 105, as well as to support communication between application server 105 and other related systems and devices not explicitly shown.

Additionally, the application server 105 in the FIG. 1 embodiment is assumed to be implemented using at least one processing device. Each such processing device generally comprises at least one processor and an associated memory, and implements one or more functional modules for controlling certain features of the application server 105.

More particularly, the application server 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the application server 105 to communicate over a network with the user devices 102 and the one or more source data servers 110, and illustratively comprises one or more conventional transceivers.

In some embodiments, the application server 105, the one or more local databases 106, and the one or more source data servers 110 may correspond to a back-end of an application or service. The application or service, in some embodiments, may provide tools for developing, testing, and deploying software applications (such as Azure DevOps (ADO), for example). In such an example, the application server 105 may comprise a local (or an on-premise) server that communicates with the one or more source data servers 110, and stores data and/or provides tools related to the application. Additionally, in some examples, the one or more source data servers 110 and the application server 105 may communicate data, via a REST API (representational state transfer application programming interface) 130, which can be stored in the one or more databases 106 as source data 107. In some embodiments, the one or more databases 106 may correspond to one or more structured query language (SQL) databases. Accordingly, the user devices 102 may correspond to a front-end of the application and service, and may communicate with the application server 105 via widget API 120 for implementing the software widget 104 corresponding to the application service.

As described in more detail elsewhere herein, the front-end of the application or service (corresponding to user device 102-1, for example) generally includes functionality for filter grouping, multi-item selection, notifications, alerts, refreshing data (for example, automatically and/or on-demand), data extraction, data rendering, displaying, and search capabilities; and the back-end of the application or service generally includes functionality for managing service calls to the one or more source data servers 110, providing the widget API 120 as-a-service, audit trails (for example, user installations, access history, and versions), and load balancing.

It is to be understood that the particular set of elements shown in FIG. 1 for implementing dynamic widgets is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the application servers 105 and local database(s) 106 can be on and/or part of the same processing platform.

Software widgets have the potential to provide helpful features to users but are often difficult to develop for complex applications or services, or when large amounts of data are involved. For example, ADO currently uses a web interface and Visual Studio interface to manage ADO work items; however, there is no mechanism to access ADO work items on a real time or near real time basis from a desktop of the user device 102. Instead, individuals rely on ADO queries, dashboards, or email notifications, all of which require continuous monitoring. This also makes it challenging to incorporate data hygiene across work item management and to adhere to release milestones in ADO.

Accordingly, one or more embodiments of the present disclosure provide a lightweight desktop widget that is configured to report and notify the real time or near real time status of items for an application or service such as, for example, ADO work items. At least some of the embodiments significantly improve the efficiency of ADO users by actioning the respective work items, thus leading to faster delivery and enhanced productivity.

Such a widget can also improve the user experience by providing easy access to the statuses of work items through simplified and enriched user interface elements. Also, immediate notifications and proactive user action on work items can be provided, thereby improving communication between users. One or more embodiments employ an API as-a-service and distributed widget architecture that is both scalable and efficient. The widget architecture, in at least one embodiment, is configured to apply an elastic search mechanism to provide accurate work item results while reducing duplicate defects. The distributed architecture, in some embodiments, improves the speed that data are extracted and rendered by the widget using API calls for on-demand and automatic refresh processes. In at least some embodiments, the elastic search mechanism includes functionality for performing a keyword search coupled with a ranking algorithm, which compares the search string to work item titles or identifiers, for example. The elastic search mechanism may then return the matching work items sorted by relevance, and a user may parse through the results and identify if the work item they intend to create already exists.

It is noted that some embodiments are described herein with respect to ADO, however, it is to be appreciated by those skilled in the art that such techniques are also applicable to other applications and/or services, for example.

Figure 2:
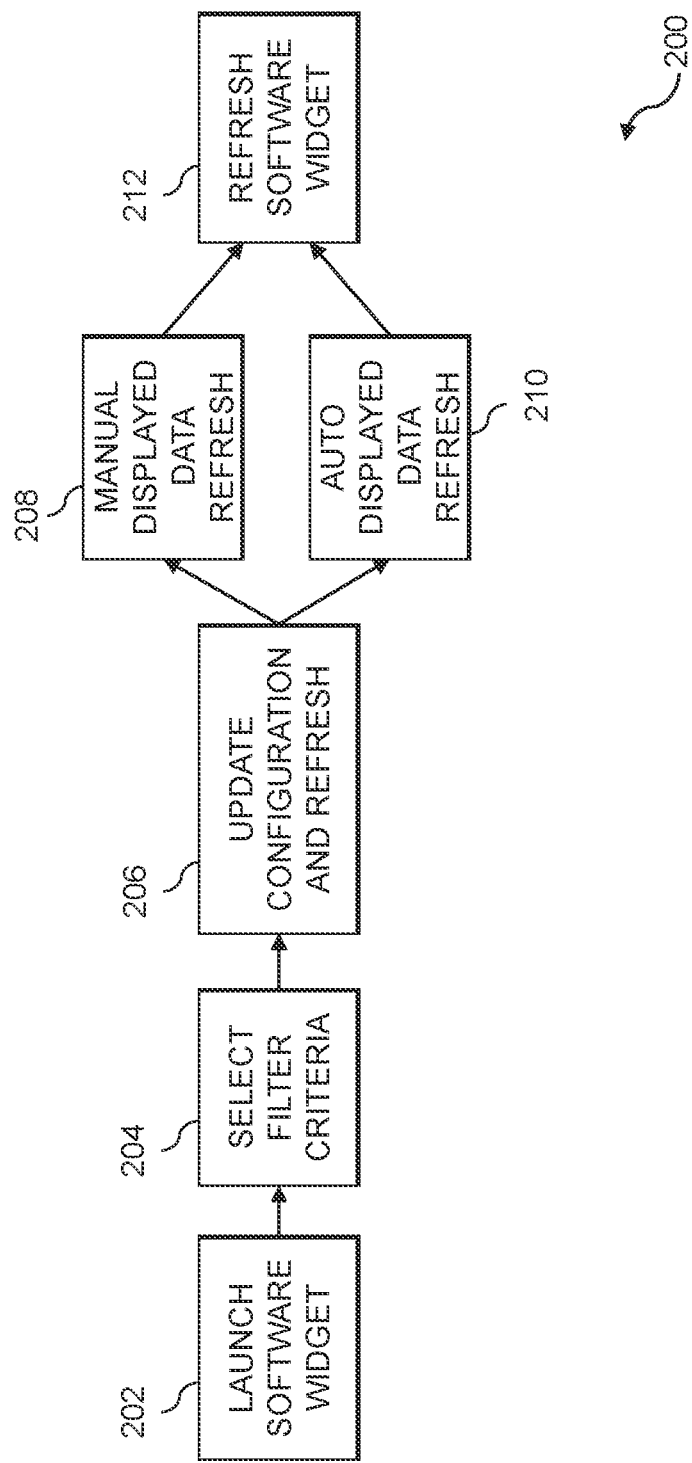
FIG. 2 shows an example of an overall data flow diagram in an illustrative embodiment.

Referring now to FIG. 2, this figure shows an example of a refresh process 200 for a widget in an illustrative embodiment. As depicted in FIG. 2, step 202 includes launching a widget (for example, software widget 104 of user device 102) for an application or service in response to a user input (such as, for example, clicking on an icon corresponding to the widget). The software widget 104, in some embodiments, is initially configured to display information on the user device 102 according to a default configuration. The software widget 104 may also be configured to present the user with a screen for configuring how information is to be displayed by the widget, or the software widget 104 may apply the last used configuration. The software widget 104 obtains data from one or more databases, such as the one or more databases 106 of FIG. 1, for example. In such an example, the application server 105 may obtain data from the one or more source data servers 110 using one or more REST API calls, which are then stored in the one or more databases 106 as source data 107. The REST API calls, in some embodiments, may comprise Open Data Protocol (oDATA) API calls. The software widget 104 may obtain at least a portion of the source data 107 from the one or more databases 106 via application server 105 based on get/post API calls of widget API 120. By way of example, the source data 107 may correspond to a subset of data from the source data server(s) 110 that are retrieved using particular field names that correspond to the data that is to be displayed by a user interface of the user device 102-1 corresponding to the widget. In embodiments that provide functionality for downloading data directly from the software widget 104 (as described in more detail below in conjunction with FIG. 4, for example), such data may also be retrieved and stored in the one or more databases 106.

Step 204 includes a user selecting filter criteria, as described in more detail below in conjunction with FIG. 6B, for example. Step 206 includes updating the widget configuration based on the selected criteria and refreshing the software widget 104 with the corresponding information. For example, step 206 may include obtaining data from the one or more databases 106 based on the selected criteria, in a similar manner as noted above. Step 208 includes manually refreshing the data displayed on the widget. For example, the software widget 104 may include user interface element (for example, an icon or a button), which updates the current fields displayed by the software widget 104 when selected by the user. Additionally, or alternatively, the displayed data may be refreshed automatically (for example, periodically and/or in a scheduled manner) at step 210. Step 212 includes refreshing the software widget 104 by updating the information displayed with the data obtained by steps 210 and/or 208.

Figure 3:
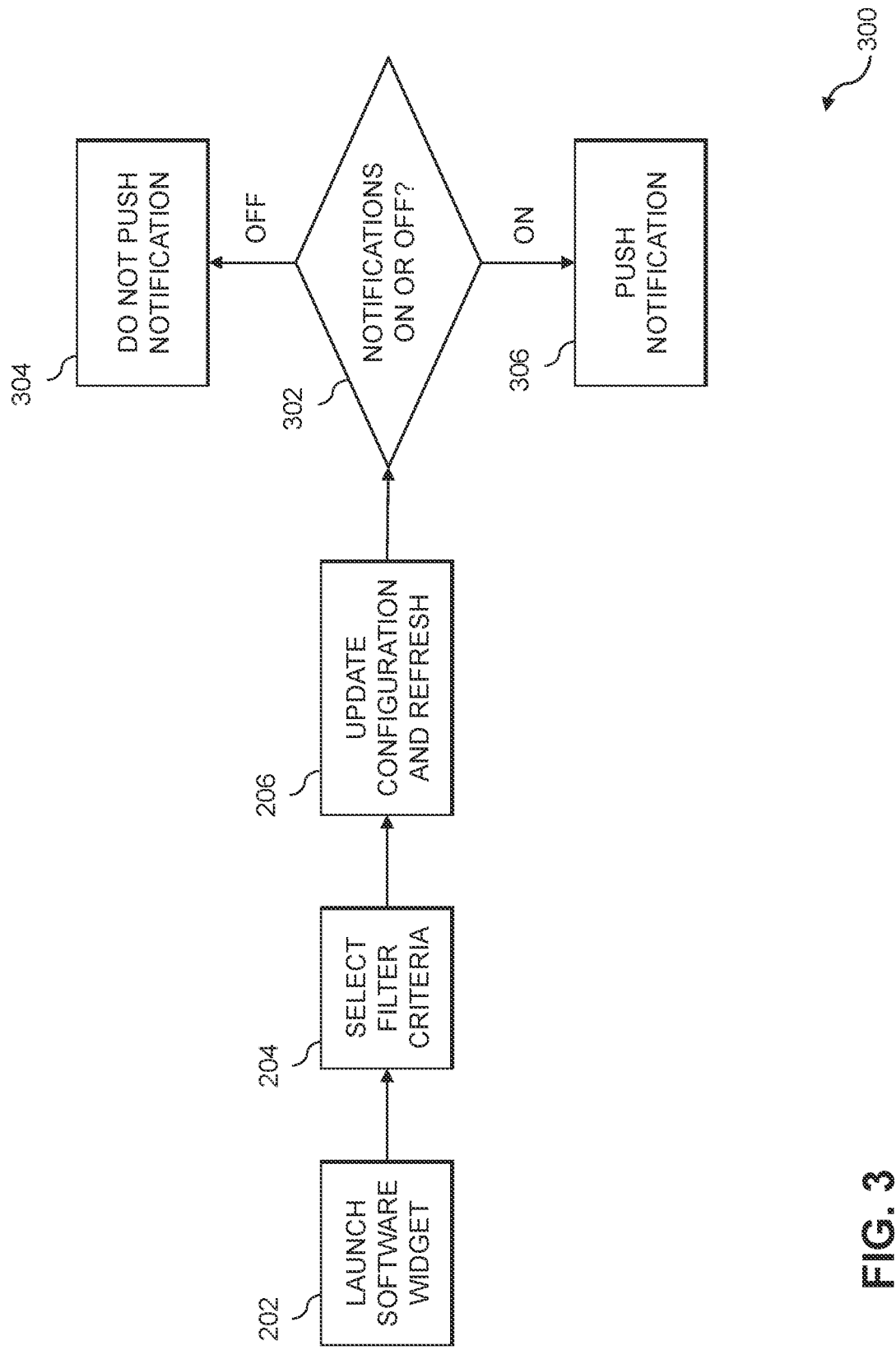
FIG. 3 shows an example of a data flow diagram for a notification process in an illustrative embodiment.

FIG. 3 shows an example of a data flow diagram for a notification process 300 in an illustrative embodiment. In the example in FIG. 3, steps 202 through 206 are performed to launch the widget, select filter criteria, and update and refresh the configuration, as described above in conjunction with FIG. 2. At step 302, a test is performed to determine if the software widget 104 is configured to turn on notifications for the selected filtering criteria. If no, then a notification is not pushed as indicated by step 304. If yes, then step 306 includes pushing a notification when the selected criteria are met.

Figure 4:
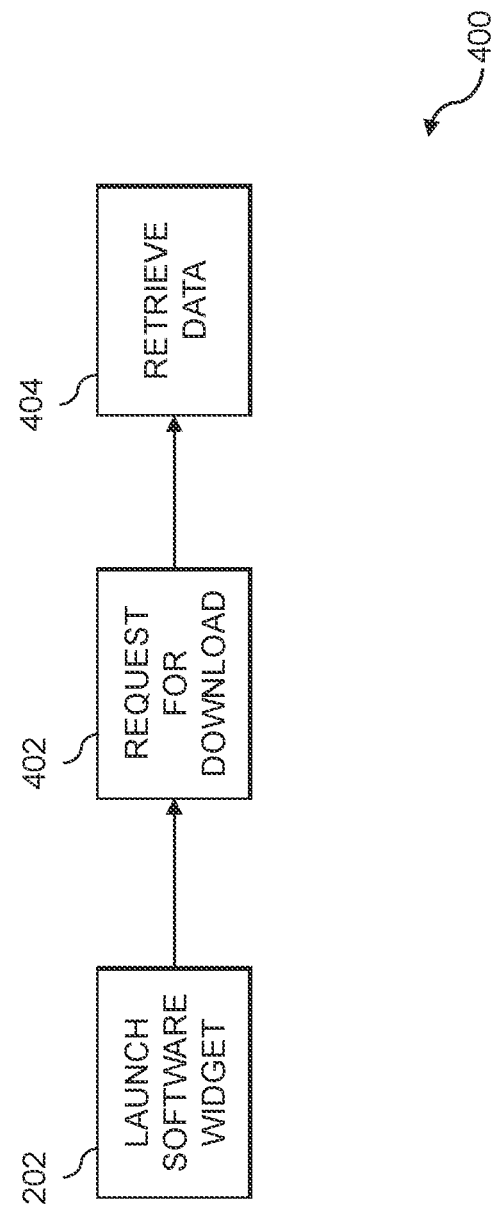
FIG. 4 shows an example of a data flow diagram for a data download process in an illustrative embodiment.

FIG. 4 shows an example of a data flow diagram for a data download process 400 in an illustrative embodiment. In the example in FIG. 4, step 202 launches the widget as described above in conjunction with FIG. 2. Step 402 includes generating a request to download particular data displayed by the widget. For example, the widget may include one or more user interface elements for downloading the information corresponding to a certain type of data item, as explained in more detail below in conjunction with FIG. 6A, for example. In response to the download request, the relevant portion of the source data 107 is retrieved as a file from the one or more databases 106 via application server 105 using get/post API calls of widget API 120 in step 404. For example, the retrieved data may be formatted into a particular type of file (for example, a comma separated file) and downloaded to the user device.

FIG. 5 shows an example of a data flow diagram for a search process 500 in an illustrative embodiment. In the example in FIG. 5, step 202 launches the widget as described above in conjunction with FIG. 2. Step 502 includes searching for one or more keywords using an elastic search service. For example, the software widget 104 may include a search field within a user interface that dynamically displays search results (for example, as a list of items) to the user as the input (e.g., keywords) is provided. Step 504 includes retrieving and outputting one or more items from the one or more databases 106 in response to completion of the user input or in response to a selection of one of the displayed search results, for example.

As an example, the search process 500 allows a user to search ADO work items by title and/or a work item identifier, for example. A list of relevant work items may be displayed within the user interface of the widget as the user is performing the search.

In one or more embodiments, the software widget running a given one of the user devices 102 extracts and renders data in a fast and efficient manner using the distributed architecture depicted in FIG. 1. More specifically, the distributed architecture allows the software widget to access the source data 107 from the database 106 via the application server 105, as opposed to accessing the data from the one or more source data servers 110. The distributed architecture, in such embodiments, significantly improves the speed of the processes depicted in FIGS. 2-5. As non-limiting examples, the distributed architecture enables the results of search process 500 to be displayed as the user is providing input and data updates to information displayed by the widget can occur in real time or near real time.

Figure 6B:
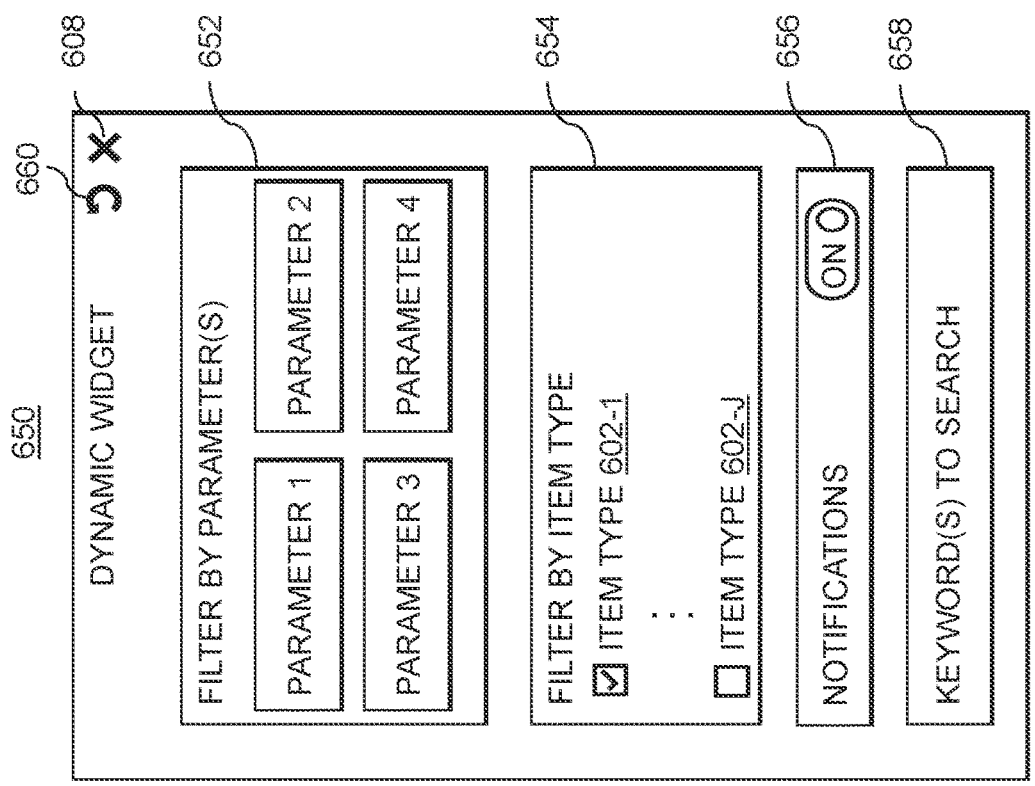
FIGS. 6A and 6B show different views of a GUI of a widget in an illustrative embodiment.
Figure 6A:
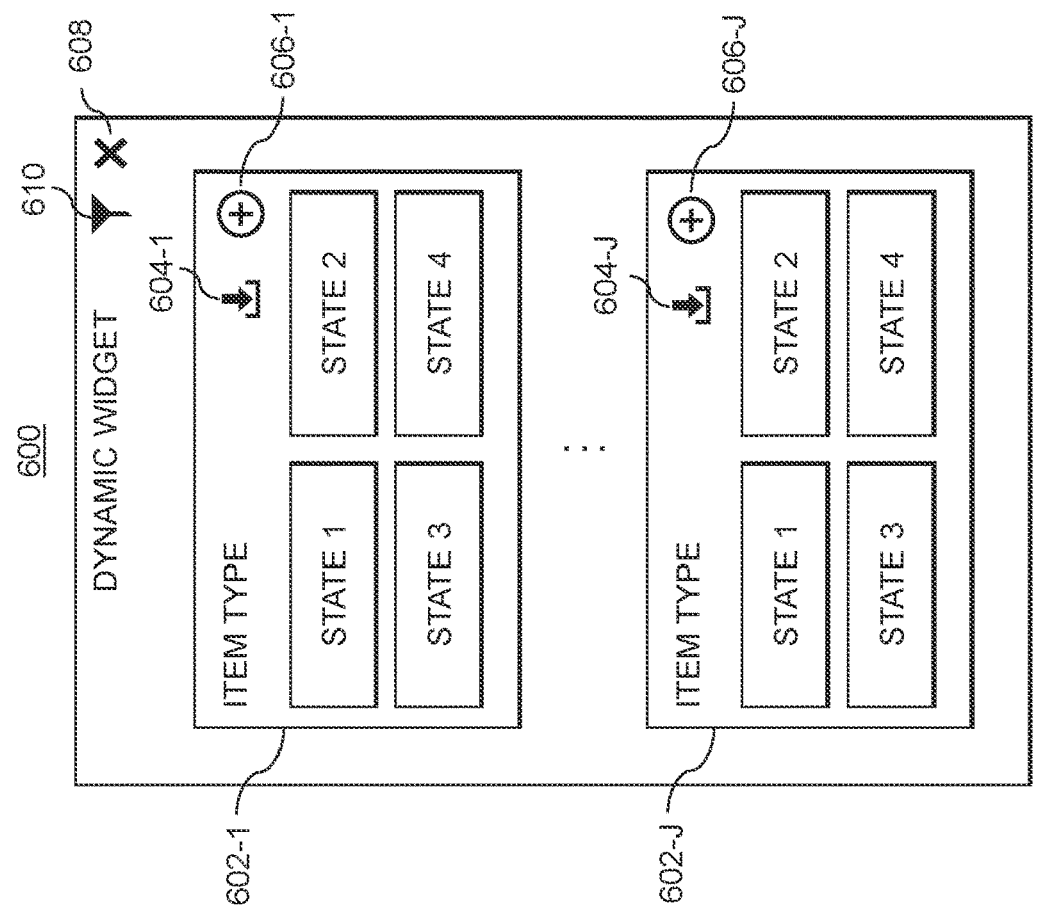

FIGS. 6A and 6B show different views of a GUI of a widget in an illustrative embodiment. A view 600 of the GUI shown in FIG. 6A comprises a plurality of fields for item types 602-1, ... 602-J, collectively referred to herein as item type fields 602. Each of the item type fields 602 include areas for displaying different states corresponding to the respective item type. In view 600, areas for states 1-4 are shown for each item type field 602; however, this is merely an example, and it is to be appreciated that each item type field 602 may have a different number of states. Using ADO as an example, each item type field may correspond to a different type of ADO work item (for example, a story, a test case, a defect, etc.). Accordingly, the states in view 600 for a story work item type may correspond to: proposed, refinement, development, integrated validation, business validation, waiting to deploy, and product deployed; and the states for a test case work item type may include: complete, design, repair, and review. A value indicating the number of work items in each of these states may be displayed in the areas of the view 600 corresponding to the different states.

The item type fields 602 in view 600 include corresponding GUI elements 604-1, ... 604-J (collectively referred to herein as GUI elements 604) and GUI elements 606-1, ... 606-J (collectively referred to herein as GUI elements 606). In response to one of the GUI elements 604 being selected (for example, via user input), the widget causes the set of work items corresponding to the item type to be downloaded, as described above in conjunction with FIG. 4, for example. In response to one of the GUI elements 606 being selected, the widget may cause a new work item of the corresponding type to be created by, for example, launching a web interface (for example, an ADO web interface) or a desktop interface (for example, Visual Studio interface).

The view 600 includes a GUI element 608 for closing the window of the widget; and GUI element 610 for opening a filter selection screen corresponding to view 650 in FIG. 6B, for example.

The view 650 includes areas 652 and 654 to apply filters based on selection of one or more parameters and filtering by item type (for example, ADO work item type), respectively. The view 650 includes areas for four parameters (i.e., parameters 1-4), and may include drop down menus although it is to be appreciated that a different number of parameters may be used in other examples. In at least one example, the areas corresponding to parameters 1-4 may each comprise a GUI element for selecting values for the parameters, such as text input fields or drop-down menus, as non-limiting examples. As an example, the parameters for ADO may include one or more of the following parameters: segments, groups, functions, applications, release target, defects found, capability, iteration path, and assignee.

In the FIG. 6B example, the area 654 of view 650 includes checkbox elements for each of the item types 602. In some embodiments, the number of item types 602 that can be selected in 654 is limited to a predefined number (for example, three). The view 600 can be updated in response to a selection of filtering criteria in the areas 652, 654. For example, if only item type 602-1 is selected, the view 600 is updated to display only the area corresponding to 602-1, and the values are updated based on the parameter selection from area 652, as described in more detail elsewhere herein.

The view 650 also includes an area 656 for turning on notifications based on the selected filtering criteria (as described above in conjunction with the process 300 of FIG. 3, for example), and an area 658 for a user to input a search query in the form of one or more keywords (as described above in conjunction with the process 500 of FIG. 5, for example). Also shown in view 650 is GUI element 660 for causing a manual data refresh to be performed, as described above in conjunction with FIG. 2, for example.

It is to be appreciated that views 600, 650 are merely examples and are not intended to be limiting. For example, the views 600, 650 may include further GUI elements such as, timestamps corresponding to the last time the widget was updated or GUI elements to display information about widget version or help topics, for example.

Figure 7:
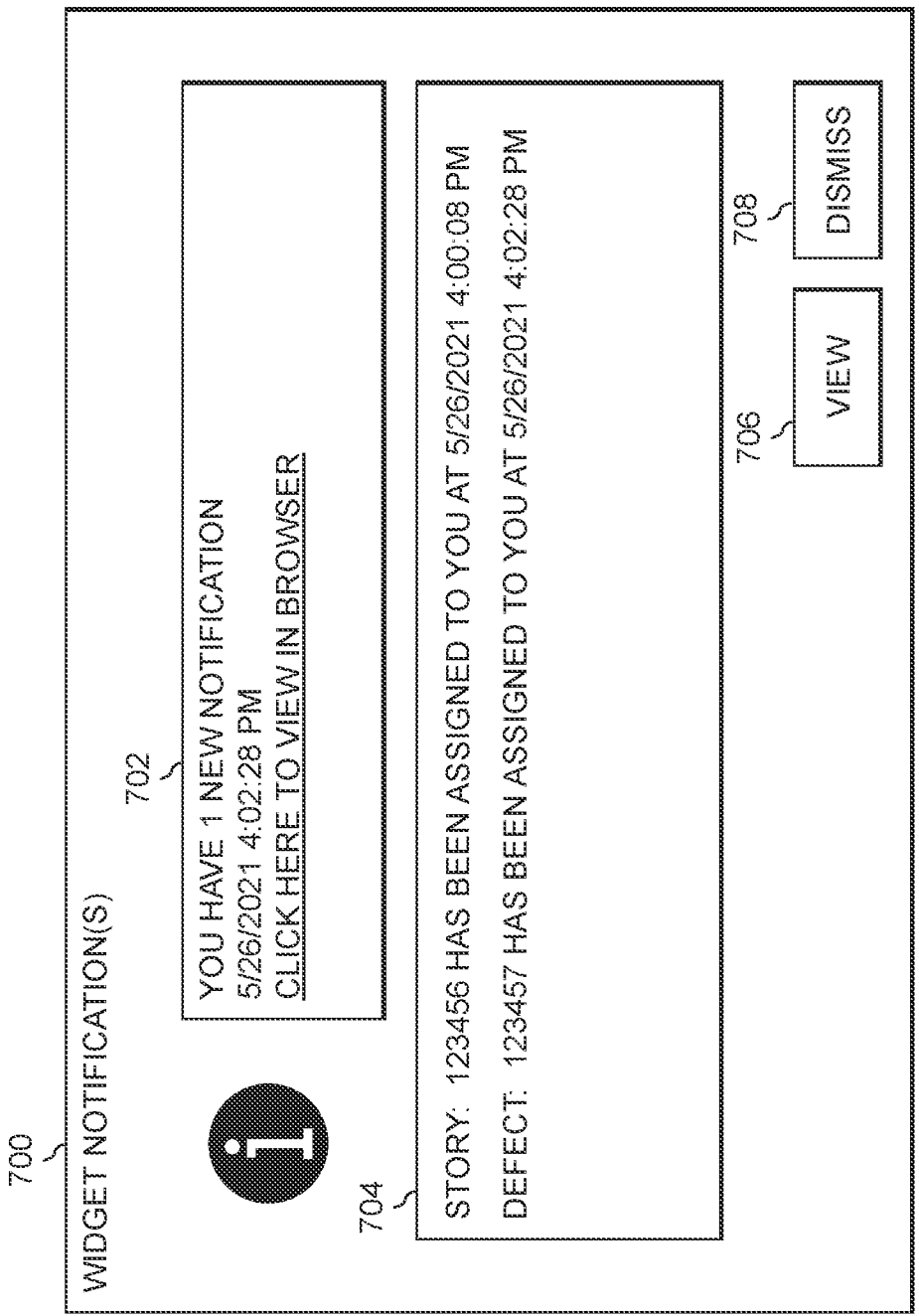
FIG. 7 shows an example of a GUI interface for notifications in an illustrative embodiment.

FIG. 7 shows a view 700 of a GUI interface for displaying notifications in an illustrative embodiment. The view 700 may be displayed in response to a notification being generated by the widget. More specifically, the view 700 includes an area 702 for displaying new notifications and information corresponding to such notification. In the FIG. 7 example, the area 702 shows that there is one new notification and a corresponding time stamp. The area 702 also provides a hyperlink (as indicated by the underlined text), to view the notification in a browser.

Also shown in view 700 is an area 704 that displays a list of all active notifications. In this example, the area 704 displays two notifications corresponding to a story work item and a defect work item. The notifications can be selected in area 704, and then be viewed or dismissed using GUI elements 706, 708, respectively. In some embodiments, other GUI elements may also be provided in view 700, such as, GUI elements to "snooze" one or more of the notification or dismiss all of the notifications, for example.

Figure 8:
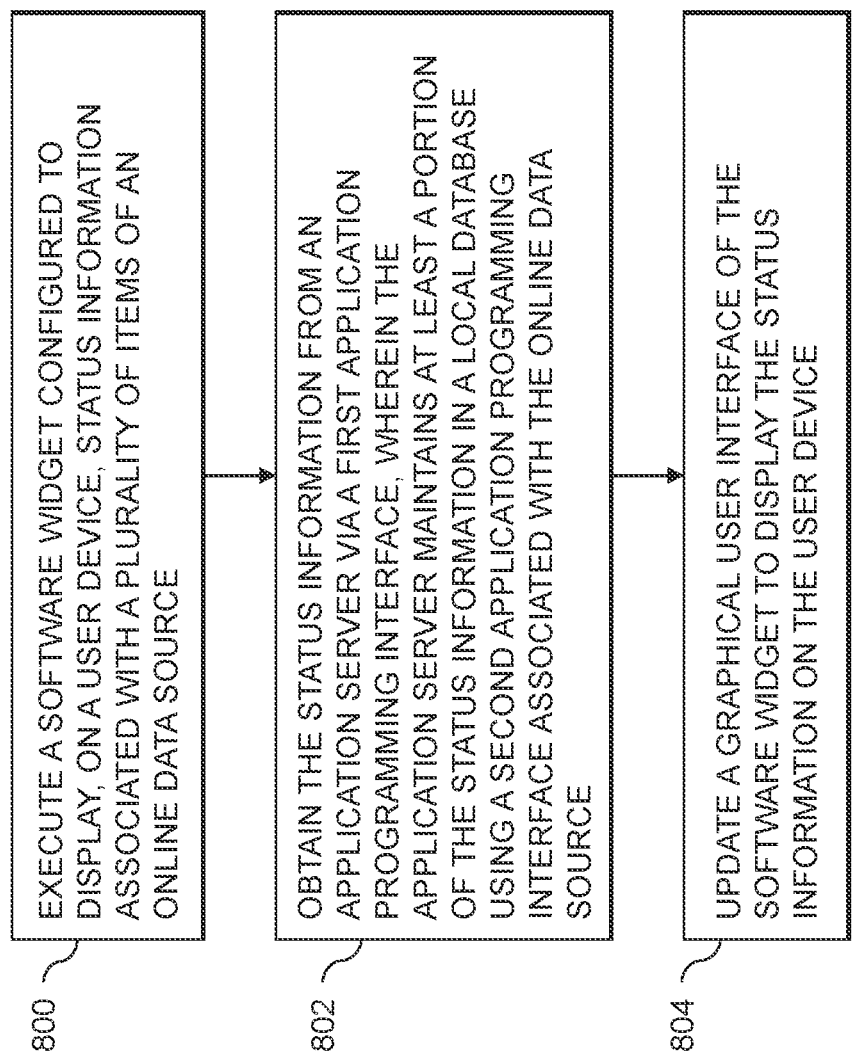
FIG. 8 shows a flow diagram of a process for implementing a dynamic widget in an illustrative embodiment.

FIG. 8 is a flow diagram of a process for implementing a dynamic widget in an illustrative embodiment. It is to be understood that this particular process is only an example, and additional or alternative processes can be carried out in other embodiments.

In this embodiment, the process includes steps 800 through 804. These steps are assumed to be performed by, for example, one of the user devices 102 utilizing at least a portion of its modules 112, 114 and 116 of software widget 104.

Step 800 includes executing a software widget configured to display, on a user device, status information associated with a plurality of items of an online data source. Step 802 includes obtaining the status information from an application server via a first application programming interface, wherein the application server maintains at least a portion of the status information in a local database using a second application programming interface associated with the online data source. Step 804 includes updating a graphical user interface of the software widget to display the status information on the user device.

The process depicted in FIG. 8 may further include the following steps: determining, in response to one or more user inputs with the graphical user interface of the software widget, one or more criteria for filtering the status information associated with the plurality of items of the online data source; extracting at least a subset of the status information based on the determined one or more criteria; and displaying, by the software widget, the extracted subset of the status information. The process may include the steps of: enabling notifications, in response to one or more additional user inputs, generated by the software widget based on the one or more criteria; refreshing the status information from the application server via the first application programming interface; and generating and displaying, by the software widget, at least one notification in response to at least one change in the extracted subset of the status information as a result of the refreshing. The steps may further include in response to receiving one or more user inputs in a search field of the software widget: (i) searching the plurality of items of the online data source based on the one or more user inputs, and (ii) displaying results of the searching. The searching may include applying an elastic search service to display the results in at least one of real time or near real time. Each of the plurality of items may be associated with a corresponding one of a plurality of item types, and the displayed status information may be grouped in the graphical user interface of the software widget based on the plurality of item types. The process depicted in FIG. 8 may include a step of providing an option within the graphical user interface of the software widget to download each of the plurality of items associated with a particular one of the plurality of item types. The status information displayed in the graphical user interface may include a value for each of a plurality of corresponding states, the value indicating a number of the plurality of items having the corresponding state. The process may include a step of applying a configuration from an extensible markup language file to update the status information of the software widget. The second application programming interface may include a representational state transfer application programming interface. The online data source may be associated with software developer services for at least one of: developing, testing, and deploying software applications.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the extraction and rendering speed of widgets. These and other embodiments can effectively overcome problems associated with existing widget techniques. For example, some embodiments are configured to provide at least one of a distributed widget architecture and real time or near real time dynamic widget features. These and other embodiments can effectively improve the speed, efficiency, and scalability of software widget relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
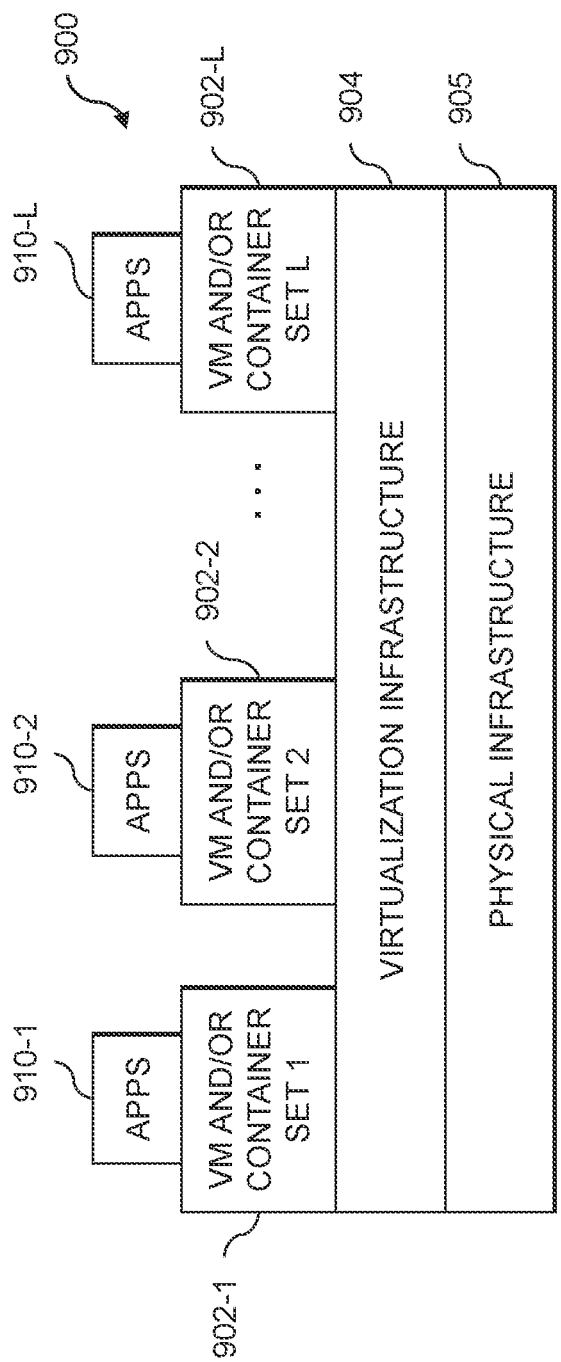
FIGS. 9 and 10 show examples of processing platforms that may be utilized to implement at least a portion of an information processing system in illustrative embodiments.
Figure 10:
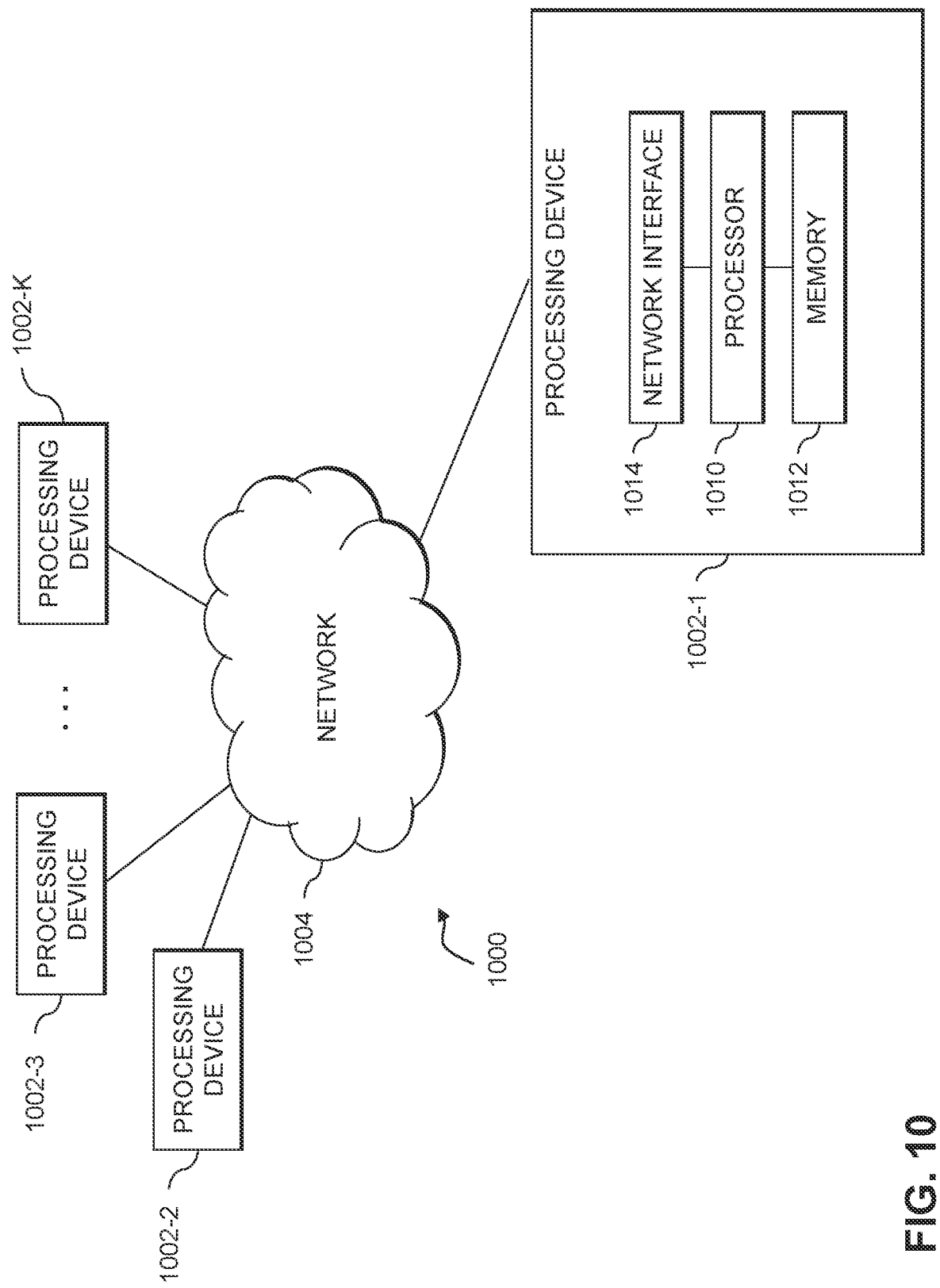

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an ASIC, a FPGA or other type of processing circuitry, as well as portions or combinations of such circuitry elements.

The memory 1012 comprises RAM, ROM or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   executing a software widget configured to display, on a user device, status information associated with a plurality of items of an online data source;
   obtaining the status information from an application server via a first application programming interface, wherein the application server maintains at least a portion of the status information in a local database using a second application programming interface associated with the online data source;
   updating a graphical user interface of the software widget to display the status information on the user device;
   extracting at least a subset of the obtained status information based on one or more criteria for filtering the status information associated with the plurality of items of the online data source;
   refreshing at least the extracted subset of the obtained status information from the application server via the first application programming interface; and
   generating and displaying, by the software widget, at least one notification in response to at least one change in the extracted subset of the obtained status information as a result of the refreshing;
   wherein the method is performed by at least one processing device comprising a processor coupled to a memory.

2. The computer-implemented method of claim 1, comprising:
   determining, in response to one or more user inputs with the graphical user interface of the software widget, the one or more criteria for filtering the status information associated with the plurality of items of the online data source;
   displaying, by the software widget, the extracted subset of the obtained status information.

3. The computer-implemented method of claim 2, further comprising:
   enabling notifications, in response to one or more additional user inputs, generated by the software widget based on the one or more criteria.

4. The computer-implemented method of claim 1, comprising:
   in response to receiving one or more user inputs in a search field of the software widget: (i) searching the plurality of items of the online data source based on the one or more user inputs, and (ii) displaying results of the searching.

5. The computer-implemented method of claim 4, wherein the searching comprises applying an elastic search service to display the results in at least one of real time and near real time.

6. The computer-implemented method of claim 1, wherein each of the plurality of items is associated with a corresponding one of a plurality of item types, and wherein the displayed status information is grouped in the graphical user interface of the software widget based on the plurality of item types.

7. The computer-implemented method of claim 6, comprising:
   providing an option within the graphical user interface of the software widget to download each of the plurality of items associated with a particular one of the plurality of item types.

8. The computer-implemented method of claim 1, wherein the status information displayed in the graphical user interface comprises a value for each of a plurality of corresponding states, the value indicating a number of the plurality of items having the corresponding state.

9. The computer-implemented method of claim 1, comprising:
   applying a configuration from an extensible markup language file to update the status information of the software widget.

10. The computer-implemented method of claim 1, wherein the second application programming interface comprises a representational state transfer application programming interface.

11. The computer-implemented method of claim 1, wherein the online data source is associated with software developer services for at least one of:
    developing, testing, and deploying software applications.

12. A non-transitory processor-readable storage medium having stored therein program code of one or more software programs, wherein the program code when executed by at least one processing device causes the at least one processing device:
    to execute a software widget configured to display, on a user device, status information associated with a plurality of items of an online data source;
    to obtain the status information from an application server via a first application programming interface, wherein the application server maintains at least a portion of the status information in a local database using a second application programming interface associated with the online data source;
    to update a graphical user interface of the software widget to display the status information on the user device;
    to extract at least a subset of the obtained status information based on one or more criteria for filtering the status information associated with the plurality of items of the online data source;
    to refresh at least the extracted subset of the obtained status information from the application server via the first application programming interface; and
    to generate and display, by the software widget, at least one notification in response to at least one change in the extracted subset of the obtained status information as a result of the refreshing.

13. The non-transitory processor-readable storage medium of claim 12, wherein the program code further causes the at least one processing device:
    to determine, in response to one or more user inputs with the graphical user interface of the software widget, the one or more criteria for filtering the status information associated with the plurality of items of the online data source; and to display, by the software widget, the extracted subset of the obtained status information.

14. The non-transitory processor-readable storage medium of claim 13, wherein the program code further causes the at least one processing device:

to enable notifications, in response to one or more additional user inputs, generated by the software widget based on the one or more criteria.

15. The non-transitory processor-readable storage medium of claim 12, wherein the program code further causes the at least one processing device:

to receive one or more user inputs in a search field of the software widget; and as the one or more user inputs are being received: (i) to search the plurality of items of the online data source based on the one or more user inputs, and (ii) to display results of the searching.

16. The non-transitory processor-readable storage medium of claim 15, wherein the searching comprises applying an elastic search service to display the results in at least one of real time or near real time.

17. An apparatus comprising:

at least one processing device comprising a processor coupled to a memory;

the at least one processing device being configured:

to execute a software widget configured to display, on a user device, status information associated with a plurality of items of an online data source;

to obtain the status information from an application server via a first application programming interface, wherein the application server maintains at least a portion of the status information in a local database using a second application programming interface associated with the online data source;

to update a graphical user interface of the software widget to display the status information on the user device;

to extract at least a subset of the obtained status information based on one or more criteria for filtering the status information associated with the plurality of items of the online data source;

to refresh at least the extracted subset of the obtained status information from the application server via the first application programming interface; and to generate and display, by the software widget, at least one notification in response to at least one change in the extracted subset of the obtained status information as a result of the refreshing.

18. The apparatus of claim 17, wherein the at least one processing device is configured:

to determine, in response to one or more user inputs with the graphical user interface of the software widget, the one or more criteria for filtering the status information associated with the plurality of items of the online data source; and to display, by the software widget, the extracted subset of the obtained status information.

19. The apparatus of claim 18, wherein the at least one processing device is configured:

to enable notifications, in response to one or more additional user inputs, generated by the software widget based on the one or more criteria.

20. The apparatus of claim 19, wherein the at least one processing device is configured:

to receive one or more user inputs in a search field of the software widget;

as the one or more user inputs are being received: (i) to search the plurality of items of the online data source based on the one or more user inputs, and (ii) to display results of the searching, wherein the searching comprises applying an elastic search service to display the results in at least one of real time or near real time.

\* \* \* \* \*

UNITED STATES PATENT AND TRADEMARK OFFICE
CERTIFICATE OF CORRECTION

| | |
|---|---|
| PATENT NO. | : 11,550,443 B1 |
| APPLICATION NO. | : 17/474525 |
| DATED | : January 10, 2023 |
| INVENTOR(S) | : Vipin Sivadas et al. |

Page 1 of 1

It is certified that error appears in the above-identified patent and that said Letters Patent is hereby corrected as shown below:

In the Claims

Column 13, Lines 52-53, Claim 2 reading "the online data source;" should read -- the online data source; and --.

Column 16, Lines 52-53, Claim 20 reading "the software widget;" should read -- the software widget; and --.

Signed and Sealed this
Third Day of September, 2024

*Katherine Kelly Vidal*

Katherine Kelly Vidal
*Director of the United States Patent and Trademark Office*